INVENTOR.
DONALD E. GREMPLER
BY Shanley & O'Neil
ATTORNEYS.

INVENTOR.
DONALD E. GREMPLER
BY Shanley & O'Neil
ATTORNEYS.

INVENTOR.
DONALD E. GREMPLER
BY Shanley & O'Neil
ATTORNEYS.

United States Patent Office 3,403,246
Patented Sept. 24, 1968

3,403,246

DATA RETRIEVAL CONTROL

Donald E. Grempler, Timonium, Md.
(305 E. Joppa Road, Towson, Md. 21204)

Filed Nov. 19, 1963, Ser. No. 324,717
7 Claims. (Cl. 235—61.7)

ABSTRACT OF THE DISCLOSURE

Improvements to record card controlled machines permitting multiple column selection of cards. Automatic encoding is provided through push-button type control panel. Individual selectors are identified with terms of the trade in which the machine is being used and arranged in columns corresponding to record card data. Control panel selection automatically controls delivery of encoded signals and electrical signals generated by stored data for proper comparison and selection of desired cards. The invention permits operation of record card controlled machines by any person familiar with the terms of the enterprise where utilized.

This invention is concerned with improvements to record card controlled machines and with methods and apparatus for use with record card controlled machines which expand the functions capable of being performed by such machines and which increase commercial applications for such machines.

In the past, record card controlled machines have been used largely for sorting of record cards based on intelligence recorded in a particular position on a card, i.e., location of a single punch on a card. While selection of cards based on plural intelligence has been possible, use of this feature has been severely limited by the complexity of the machine entry problems. Prior practice with these machines is well known and described in "Reference Manual IBM 82, 83, and 84 Sorters," copyrighted 1949, 1953, 1955, 1957, 1959, 1961, and 1962 by International Business Machines, and in "IBM Customer Engineering Manual of Instruction 83 Sorter," copyrighted by International Business Machines 1956, 1962, and patents on some basic features of record card controlled machines include the patents to Luhn #2,616,561; Samain #2,618,386; and Luhn #2,720,360. For background purposes and in the interest of brevity in describing the invention, reference shall be had to the above-mentioned IBM manuals which are incorporated herein by reference.

In the accompanying drawings, described briefly below, like numerals will be used to designate like elements throughout the various figures.

Figure 1:
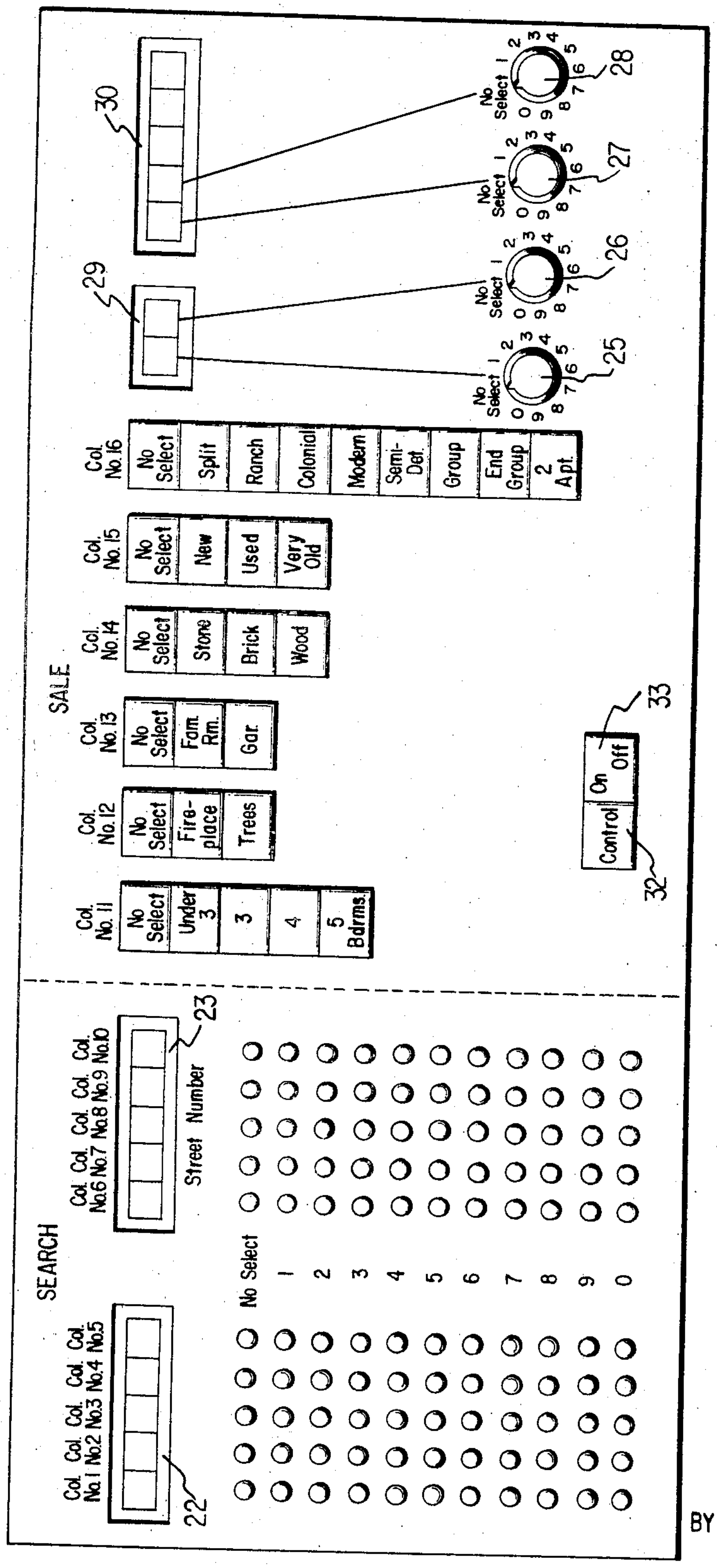
FIGURE 1 shows control panel structure forming part of the invention.

While the IBM® 082 and 083 record card controlled machines have been successful, their use by lay operators has generally been limited to functions involving card sorting only. As is known, cards for these machines record intelligence by punched holes positioned by column number and digit number. Card columns are numbered from one through eighty and digit locations within each column are ordinarily twelve in number. Record cards can be scanned by electrical brush means or photoelectrically at present. Most commonly, a single brush senses a datum recorded in a particular column and digit location, and cards are sorted accordingly.

Plural column brush assemblies are available so that cards can be selected, rather than sorted, based on multiple-column intelligence. Multiple-column selector theory and apparatus are described particularly in the "IBM Customer Engineering Manual of Instruction 83 Sorter," pages 43 to 49. Ordinarily, it is necessary to have a technician or machine operator wire a control panel when multiple-column card selection is desired. Plugboards could be prepared for particular situations which arose frequently such as the plugboard described in the "Plugboard For Use In Patchcord Programming Systems" patent to Cohen #3,004,235, issued October 10, 1961; however, even that procedure has not been suggested previously. The prior art method and apparatus for control panel wiring are presented on page 45 of the IBM® 83 Sorter "Manual of Instruction," referred to above. A brief scanning of this reference will make it obvious why the practice is not widespread.

Patchcord wiring itself seriously limits use of any machine. First, it requires an operator familiar with the machine and capable of becoming familiar with the industry where the machine is sought to be employed. Next, it requires personnel in the industry familiar with the capabilities of the machine and with opportunities for its application in the particular industry. These limitations have limited card controlled machine applications primarily to sorting functions. Regardless of application or industry, however, lay personnel approach these machines in their present form with a great deal of reluctance and only consider doing the most primitive sorting jobs after somewhat extended training.

A primary objective of the present invention is provision of apparatus which will permit useful operation of record card controlled machines by lay personnel of any industry where employed, rather than by trained operators. For example, the present invention will permit multiple-column selection of sales cards or real estate listing cards by real estate agents, or multiple-column selection of identity cards from descriptions of suspects by police officers, or multiple-column selection of qualified persons by employment offices, and similar applications wherein only knowledge of the language of the industry is necessary for a person to use a record card controlled machine far beyond its present limitations.

A control panel for use in the present invention employs language which is familiar to personnel of the industry or enterprise where the machine is being used, permitting fast access to stored information by lay personnel, without encoding difficulties. A typical control panel for use in a real estate office is shown in FIGURE 1.

The control panel of FIGURE 1 can be used to retrieve data based on information encoded in twenty columns of a control card. The left portion of the panel labeled "SEARCH" handles columns numbered one through ten, while the right side of the panel labeled "SALE" handles columns numbered eleven through twenty. The multiple-list number and street number buttons on the SEARCH side of the panel are interlocked permitting selection of one number only per column. Illuminated panels 22 and 23 above the keys are connected electrically to indicate the numbers selected at the keys below.

The SALE side of the panel employs electrically interlocked switches for columns 11 through 16 which can be labeled as shown. Each of these buttons is illuminated upon selection by lighting means to be described. A zone number and price may be selected at dials 25, 26, 27, and 28. Illuminated panels 29 and 30, respectively, show the dialed selections. Operation on either the SEARCH side or the SALE side of the panel is selected through control button 32. On-off for the multiple-column card selector apparatus is controlled at button 33.

A typical panel selection made by a real estate agent in order to obtain desired real estate listings will be described for purposes of comparison with the complicated prior art procedure set forth on page 45 of the IBM® 83 Manual of Instructions described above. An agent desiring all used brick houses listed in his area having four bedrooms, a fireplace, and colonial architecture would merely push buttons as labeled for the desired information which would be the fourth button of column #11, the second button of column #12, the third button of column #14, the third button of column #15, and the fourth button of column #16. If the agent wanted to limit selected listings to a particular zone, he would make an election at dials 25 and 26. If a price range of $20,000 to $29,000, for example, were required, dial 27 would merely be set at "2" and the machine would select all houses in this price range. The price can be further pinpointed by a selection at dial 28.

If cards having a particular multiple-list number or a particular street number are desired, the control button 32 would be depressed to switch control to the SEARCH side of the panel. Selection of the particular multiple-list or street number card would be obtained by depression of particular numbers on the selector buttons on the SEARCH side of the panel. The SEARCH side of the panel can also be used for card file maintenance.

It is part of the teachings of the present invention to provide a control panel which anyone who can read and write and who is familiar with the terms of the enterprise where employed can operate. For purposes of describing the invention, a real estate operation is used, however, the principles of the invention are readily applicable to other enterprises without departing from the scope of the invention claimed.

In accordance with the teachings of the present invention, selection of desired information on a panel as described above automatically encodes such desired information into electrical signals usable by the card controlled machine. Further, selection also automatically sets up circuits which control delivery of such encoded signals, along with electrical signals generated during scanning of record cards, so that the required comparison of these electrical signals can be carried out during card scanning by the machine.

By way of background and considering the "compare" function performed by IBM® card controlled machines, electrical signals are produced by sensing holes punched in the cards with multiple-column wire brushes, photosensitive devices, or the like. Other electrical signals, based on information desired from the machine, must be compared to the electrical signals produced by sensing card coded information. Ordinarily, a plurality of compare circuits are employed for this purpose, the number of compare circuits corresponding to the number of card columns being interrogated. Comparison of electrical signals determines acceptance or rejection of a particular card.

Figure 2:
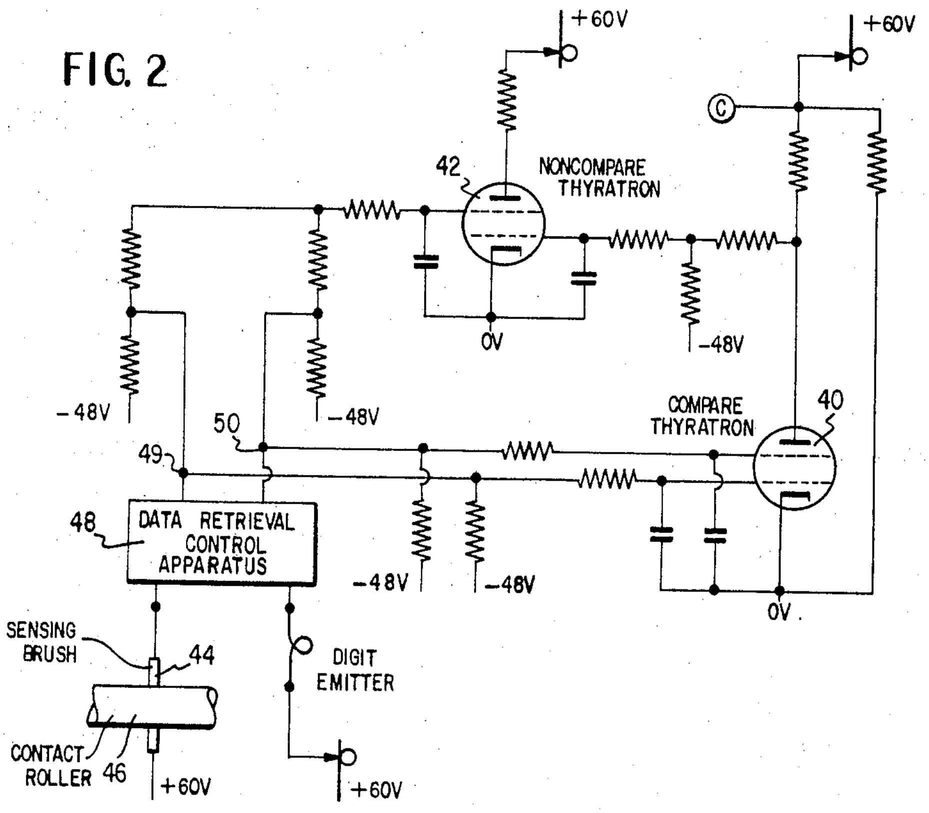
FIGURE 2 is a schematic diagram of circuitry and structure embodying the invention.

Typical compare circuitry is shown and described in the "IBM Customer Engineering Manual of Instructions 83 Sorter," pages 46 and 44. A schematic illustration of such compare circuitry suitable for purposes of describing the present invention is shown as a part of FIGURE 2. A detailed description of the compare circuitry itself is not necessary to an understanding of the present invention; its function as related to the invention will be understood from the following. A single column compare circuit as shown in FIGURE 2 includes a compare thyratron 40 and a non-compare thyratron 42. These are used to compare electrical signals from card encoded information and desired information encoded by the apparatus of the present invention. Card encoded information is sensed by brush 44 during passage of a card between brush 44 and contact roller 46. The electrical signal produced is delivered by control apparatus 48 to terminal point 49 of the compare circuitry. Electrical signals produced by desired information and automatically encoded by the control apparatus 48, are introduced into the compare circuitry at terminal point 50. With coincidence of signals arriving at points 49 and 50, a card is accepted. A signal arriving at either one of terminal points of the compare circuit, 49 or 50, without a coincident signal arrival at the remaining terminal point causes rejection of the card being scanned. It will be realized that with a ten column selector and ten brush assembly, a plurality of compare circuits as described above, each corresponding to a column selected would be used permitting multiple-column selection of record cards.

Figure 3:
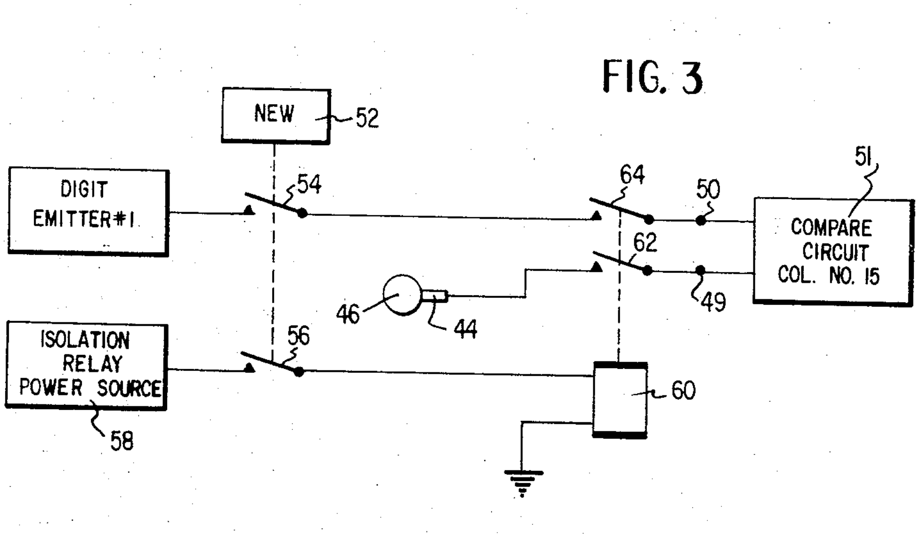
FIGURE 3 is an electrical schematic diagram of circuitry and structure embodying the invention.

The multiple-column card selector apparatus of the present invention encodes desired information and controls delivery of electrical signals for card coded information and desired information automatically upon selection of entry inputs at a control panel such as that shown in FIGURE 1. FIGURE 3 shows simplified circuit relay means for carrying out these functions and delivery of electrical signals to terminal points 49 and 50 of compare circuit 51, such relay means being operable upon selection of a single digit on the control panel of FIGURE 1. It will be understood that similarly operable relay means are required for each digit selected.

For operation of the circuit shown in FIGURE 3, depression of control panel selector key 52 closes switch 54 and switch 56. The latter closes the circuit between isolation relay power source 58 and relay coil 60. Energization of relay coil 60 closes isolation relay switch 62 between brush 44 on contact roller 46 and compare circuitry terminal point 49. Energization of relay coil 60 also closes isolation relay switch 64 between Digit Emitter #1 of the card controlled machine and terminal point 50 of compare circuit 51.

Figure 4:
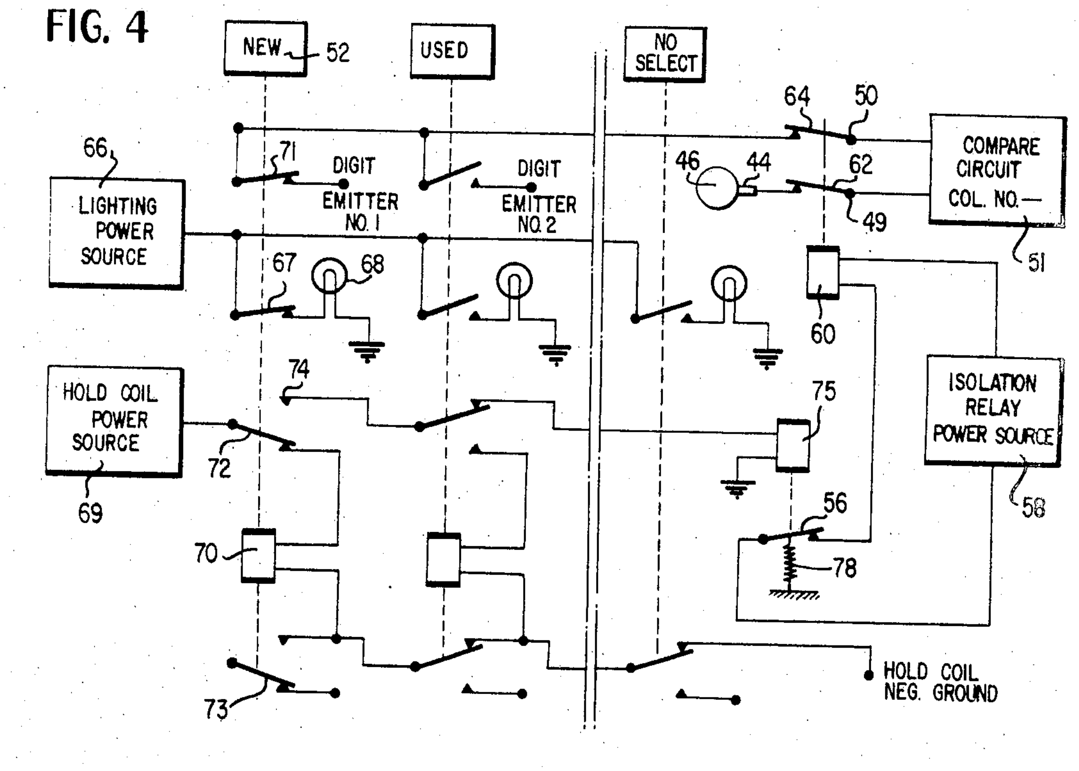
FIGURE 4 is an electrical schematic diagram of circuitry and structure embodying the invention.

Ordinarily, a plurality of compare circuits would be used corresponding in number to the number of columns on which selection is made. The number of digit emitter switch means as shown in FIGURE 3 is dependent upon the number of digit selections available in a particular column. For example, column 16 includes information at eight digit positions, labeled as follows: SPLIT, RANCH, COLONIAL, MODERN, SEMI-DETACHED, GROUP, END GROUP, and 2 APARTMENT. Column 15, from which the examples of FIGURES 3 and 4 are drawn, includes three selections: NEW, USED, and VERY OLD.

A circuit for automatically connecting any of a plurality of digit emitters from one column to the corresponding compare circuit and to connect the brush signal to the same compare circuit is shown schematically in FIGURE 4. Additions to the simplified circuit shown in FIGURE 3 are the lighting means and the hold coil circuit for automatic holding of a selection and isolation of a compare circuit when not in use. The lighting means includes a power source 66 and switch means such as 67 and light means such as 68. The holding coil circuit includes a hold coil power source 69 and a plurality of relay coils such as 70 which are electrically interlocked. An advantage of the hold coil and lighting arrangement shown in FIGURE 4 is that a record of information asked of the machine is in front of the person using the machine at all times until further information is requested.

For operation of the circuit shown in FIGURE 4, assume that the key 52, labeled NEW, has been depressed, switch 71 to Digit Emitter #1 will be closed by this action; the selected key 52 will be illuminated by closing of switch 67, and power will be delivered to the hold coil 70 through switch 72, interlocking switch 73 will be opened and switches 67, 71, 72, and 73 will be held in this position by hold coil 70. With removal of switch 72 from contact 74, power is interrupted to relay 75 which had been holding switch 56 open. Switch 56 is closed by spring 78 and isolation relay power source 58 activates relay 60 to close isolation relay switches 62 and 64 and deliver electrical signals for comparison to the compare circuit terminals 49 and 50. When power is removed from the circuit the isolation relays automatically open. Depressing the NO SELECT button will interrupt hold coil power and any selector key which has been depressed will be released. Similar circuitry for each of the selector means is utilized in the various columns used for multiple-column selection.

In accordance with the present invention, the SALE and SEARCH sides of the panel are connected to permit use of the same ten column brush assembly with corresponding compare circuits permitting columns in multiples of ten, e.g., twenty columns, of information to be interrogated with a single ten brush assembly. Circuit means for taking advantage of this portion of the invention are shown in FIGURE 5.

Figure 5:
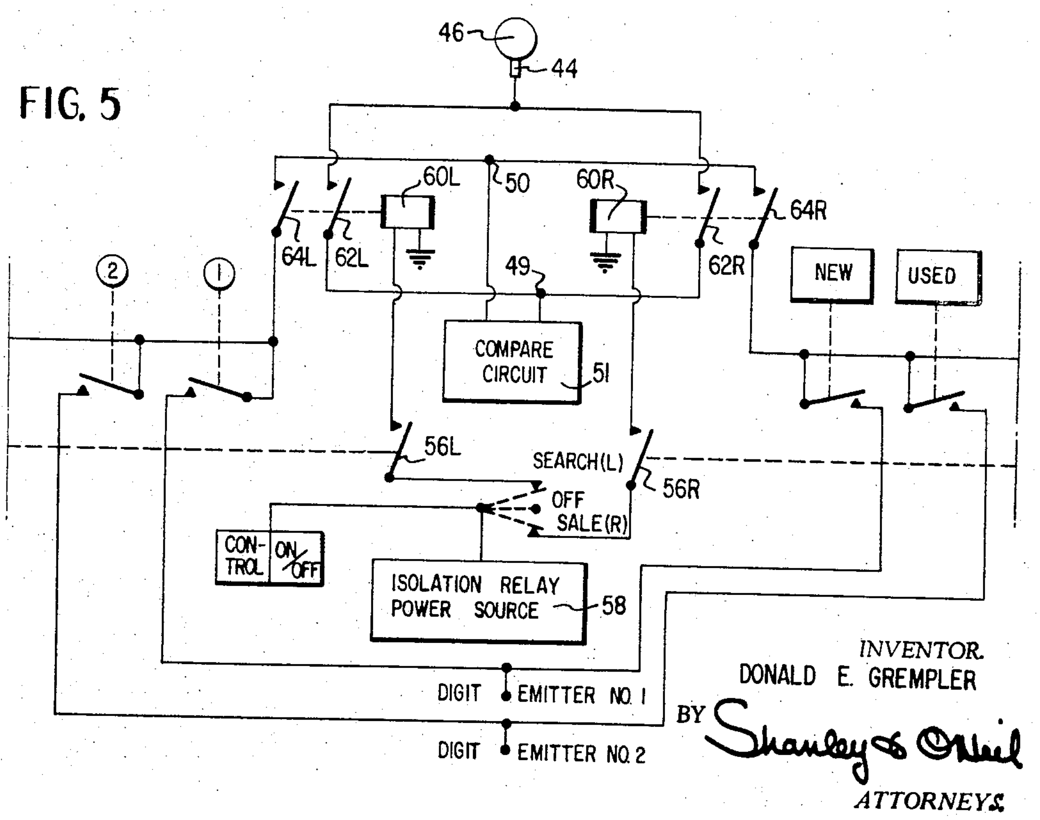
FIGURE 5 is an electrical schematic diagram of circuitry and structure embodying the invention.

As shown in FIGURE 5, brush 44 and terminal contacts 49 and 50 of compare circuit 51 and the digit emitter contacts of the card controlled machine are common to both sides of the control panel SEARCH (left) and SALE (right). The isolation relay means including switches 62 and 64 are duplicated on each side of the panel and serve the same function as described in relation to FIGURES 3 and 4. In FIGURE 5, the simplified schematic for a single digit emitter of FIGURE 3, omitting the light and hold coil circuits of FIGURE 4, is used. Duplicate parts on each side of the panel use the same numerals and are distinguished by use of the letters L and R designation. Operation of this circuit arrangement can readily be determined from the schematic; power to the right side of the panel permits selection from this side to reach the compare circuit and selections which may exist on the left side of the panel have no effect. In this way, a ten single brush assembly can be used to interrogate a plurality of ten column groups without creation of back circuits in either the brush or emitter circuitry. Various ten column groups can be interrogated either by movement of the brush assembly or inverting the cards end to end for feeding through the machine. The latter enables, e.g., column one to ten and seventy-one through eighty to be interrogated.

In order to describe novel methods and apparatus for automatic entry to and operation of somewhat complex card controlled machines, a specific embodiment using simplified electromechanical devices has been used. From this disclosure, however, electronic and solid state circuits or other means for achieving the objectives of the present invention are readily derivable. Therefore, it is to be understood that the present invention is not limited to applications of the specific embodiment and the scope of the present invention is to be determined by the scope of the appended claims.

What is claimed is:

1. In combination with a card sorting machine having a plurality of electrical signal compare circuits corresponding to a plurality of encoded columns on record cards,
- multiple-column card selector apparatus for automatically wiring the card sorting machine to compare encoded card information with desired information, comprising:
  - control panel means including a plurality of individual selectors identified with terms of the industry where used and representative of record card encoded information, the individual selectors being arranged in columns corresponding to encoded columns of record cards, and
  - circuit means including relay means operated by individual selectors to automatically control delivery of card encoded electrical signals and desired information electrical signals to proper compare circuits of the card sorting machine upon selection of desired information on the control panel means.

2. The apparatus of claim 1 in which the panel means include means for indicating encoded information selected.

3. The apparatus of claim 1 in which the circuit means includes selector interlock means to prevent selection of more than one selector per column of encoded information.

4. In combination:
- a card sorting machine including electrical signal compare circuitry, means for generating electrical signals, responsively to card encoded information, means for generating electrical signals responsively to desired information to be encoded, and means for delivering generated electrical signals to the compare circuitry,
- control panel means for selecting desired information to be encoded for delivery to the card sorting machine, the panel means including a plurality of individual selector means identified with terms of the industry where used and representative of record card stored information, and
- circuit means connecting the control panel means to the card sorting machine including relay means responsive to the individual control panel selector means to automatically encode desired information signals upon selection of control panel selector means and control delivery of electrical signals responsive to card encoded information and encoded desired information to compare circuitry of the card sorting machine during passage of encoded cards through the machine.

5. The combination of claim 4 in which the selector means of the control panel means include individual selector buttons arranged in columns corresponding to columns of card encoded information.

6. The combination of claim 4 in which the relay means responsive to the selector means of the control panel means include switch means for encoding desired information signals for input to the card sorting machine upon selection of an individual selector means and additional switch means for controlling delivery of card encoded electrical signals and encoded desired information electrical signals to the compare circuitry during passage of the encoded card through the machine.

7. The combination of claim 4 in which the control panel means includes means for indicating encoded information selected.

References Cited

UNITED STATES PATENTS 3,023,399 2/1962 Dickinson ---------- 340—149
3,148,460 9/1964 Haritonoff ------------ 35—48

MAYNARD R. WILBUR, *Primary Examiner.*

T. J. SLOYAN, *Assistant Examiner.*